US009858591B2

(12) United States Patent
McNeil et al.

(10) Patent No.: US 9,858,591 B2
(45) Date of Patent: Jan. 2, 2018

(54) EVENT DETERMINATION AND INVITATION GENERATION

(71) Applicant: International Business Machines Corporation, Armonk, NY (US)

(72) Inventors: Kristin E. McNeil, Charlotte, NC (US); Soomi Mun, Stallings, NC (US)

(73) Assignee: International Business Machines Corporation, Armonk, NY (US)

(*) Notice: Subject to any disclaimer, the term of this patent is extended or adjusted under 35 U.S.C. 154(b) by 530 days.

(21) Appl. No.: 13/629,981

(22) Filed: Sep. 28, 2012

(65) Prior Publication Data
US 2014/0095597 A1 Apr. 3, 2014

(51) Int. Cl.
*G06Q 30/02* (2012.01)
*G06Q 10/10* (2012.01)
*G06Q 50/00* (2012.01)

(52) U.S. Cl.
CPC ..... *G06Q 30/0252* (2013.01); *G06Q 10/1095* (2013.01); *G06Q 50/01* (2013.01)

(58) Field of Classification Search
CPC ............. G06Q 50/01; G06Q 10/1095; G06Q 30/0252; G06F 15/16
USPC .................................................. 709/204, 206
See application file for complete search history.

(56) References Cited

U.S. PATENT DOCUMENTS

| 5,124,912 A * | 6/1992 | Hotaling | G06Q 10/06314 40/107 |
| 7,092,998 B2 * | 8/2006 | Frietas | H04L 29/06 379/93.15 |
| 7,523,385 B2 * | 4/2009 | Nguyen | G06Q 10/02 705/5 |

(Continued)

FOREIGN PATENT DOCUMENTS

| EP | 1122672 A2 | 8/2001 |
| JP | 2014089320 A | 5/2014 |

OTHER PUBLICATIONS

Juan J. Cameron et al.; "Finding Strong Groups of Friends among Friends in Social Networks"; 2011 IEEE Ninth International Conference on Dependable, Autonomic and Secure Computing; IEEE Computer Society; pp. 824-831; Copyright 2011 IEEE.

(Continued)

*Primary Examiner* — Patrice Winder
*Assistant Examiner* — Angela Widhalm de Rodriguez
(74) *Attorney, Agent, or Firm* — Alexander G. Jochym

(57) ABSTRACT

An invitation is created on a social network. To create the invitation, a computer receives, from a social networking program operating on a first computer system by an event program operating on a second computer system, data from a social networking post. The computer identifies, by the event program, information from the data associated with a first member of a social network. The computer determines whether the information includes information about a future event that the first member intends to participate in. The (Continued)

computer generates an invitation to a second member of the social network for the future event based on the information about the future event. The computer transmits the invitation for the social networking post for sending by the social networking program to a user device of the second member of the social network.

17 Claims, 4 Drawing Sheets

(56) References Cited

U.S. PATENT DOCUMENTS

| | | | | |
|---|---|---|---|---|
| 7,590,565 | B2* | 9/2009 | Ward | G06Q 10/08 705/26.8 |
| 7,821,874 | B2* | 10/2010 | Liu | G06Q 10/109 368/10 |
| 7,882,032 | B1* | 2/2011 | Hoffman | G06F 21/6218 705/50 |
| 8,108,414 | B2 | 1/2012 | Stackpole | |
| 8,241,116 | B2* | 8/2012 | Ocko | A63F 13/12 463/29 |
| 8,260,321 | B1* | 9/2012 | Dunko | 455/456.3 |
| 8,396,490 | B2* | 3/2013 | Platt | G06Q 10/107 455/414.2 |
| 8,429,292 | B2* | 4/2013 | Adams | G06Q 10/107 709/202 |
| 8,473,319 | B2* | 6/2013 | Yokoi | G06Q 10/06398 705/7.11 |
| 8,510,123 | B2* | 8/2013 | Bonev | G06F 17/30029 705/1.1 |
| 8,738,414 | B1* | 5/2014 | Nagar | G06Q 10/101 705/7.12 |
| 8,825,760 | B1* | 9/2014 | Harris | 709/204 |
| 8,832,205 | B2* | 9/2014 | Nelson et al. | 709/206 |
| 8,887,066 | B1* | 11/2014 | Deng | G06Q 10/109 715/753 |
| 9,129,264 | B2* | 9/2015 | Lyle | G06Q 10/06311 |
| 9,152,946 | B2* | 10/2015 | Rankin, Jr. | G06Q 10/10 |
| 9,191,355 | B2* | 11/2015 | Yerli | H04L 51/32 |
| 9,256,902 | B2* | 2/2016 | Chateau-Artaud | G06Q 30/0601 |
| 9,356,902 | B2* | 5/2016 | Davenport | H04L 51/14 |
| 9,384,472 | B2* | 7/2016 | Logtenberg | G06Q 10/109 |
| 9,576,325 | B2* | 2/2017 | Narayanan | G06Q 50/01 |
| 9,736,104 | B2* | 8/2017 | McNeil | H04L 51/32 |
| 2007/0162458 | A1* | 7/2007 | Fasciano | 707/10 |
| 2007/0233736 | A1 | 10/2007 | Xiong et al. | |
| 2007/0243887 | A1* | 10/2007 | Bandhole et al. | 455/461 |
| 2008/0098313 | A1* | 4/2008 | Pollack | 715/753 |
| 2008/0235084 | A1* | 9/2008 | Quoc et al. | 705/14 |
| 2009/0228322 | A1* | 9/2009 | van Os et al. | 705/9 |
| 2009/0282144 | A1 | 11/2009 | Sherrets et al. | |
| 2009/0287790 | A1 | 11/2009 | Upton et al. | |
| 2010/0180211 | A1* | 7/2010 | Boyd | G06Q 10/109 715/751 |
| 2010/0218128 | A1 | 8/2010 | Bonat et al. | |
| 2011/0066710 | A1 | 3/2011 | Paul | |
| 2011/0072125 | A1* | 3/2011 | Quoc | G06Q 10/02 709/223 |
| 2011/0106528 | A1 | 5/2011 | Maddison | |
| 2011/0106892 | A1 | 5/2011 | Nelson et al. | |
| 2011/0125826 | A1 | 5/2011 | Erhart et al. | |
| 2011/0153740 | A1 | 6/2011 | Smith et al. | |
| 2011/0154223 | A1 | 6/2011 | Whitnah et al. | |
| 2011/0207482 | A1 | 8/2011 | Shamma et al. | |
| 2011/0231409 | A1* | 9/2011 | Dhara et al. | 707/748 |
| 2011/0289011 | A1* | 11/2011 | Hull | G06Q 10/107 705/319 |
| 2012/0004956 | A1 | 1/2012 | Huston et al. | |
| 2012/0047219 | A1 | 2/2012 | Feng et al. | |
| 2012/0072358 | A1 | 3/2012 | Famous et al. | |
| 2012/0078667 | A1 | 3/2012 | Denker et al. | |
| 2012/0079020 | A1 | 3/2012 | Park et al. | |
| 2012/0136689 | A1 | 5/2012 | Ickman et al. | |
| 2012/0245925 | A1 | 9/2012 | Guha et al. | |
| 2012/0290950 | A1 | 11/2012 | Rapaport et al. | |
| 2013/0060592 | A1* | 3/2013 | Motoyama | G06Q 10/1095 705/7.19 |
| 2013/0117057 | A1* | 5/2013 | Van Moltke | G06Q 10/06311 705/7.13 |
| 2013/0198652 | A1* | 8/2013 | Dunn | G06F 3/0484 715/751 |
| 2013/0290059 | A1* | 10/2013 | Troiani | G06Q 10/06315 705/7.19 |
| 2013/0290188 | A1* | 10/2013 | Olliphant | G06Q 20/405 705/44 |
| 2013/0317808 | A1* | 11/2013 | Kruel | H04L 51/32 704/9 |
| 2014/0019187 | A1* | 1/2014 | Olsen | G06Q 10/06313 705/7.23 |
| 2014/0029046 | A1 | 1/2014 | Ponnavaikko et al. | |
| 2014/0081690 | A1* | 3/2014 | Winters | G06Q 10/06311 705/7.15 |
| 2014/0089320 | A1* | 3/2014 | Baldwin | G06F 17/30867 707/748 |
| 2014/0089418 | A1* | 3/2014 | Davenport et al. | 709/206 |
| 2014/0317201 | A1 | 10/2014 | McNeil et al. | |
| 2014/0343990 | A1* | 11/2014 | Photowat | G06Q 10/1097 705/7.17 |
| 2015/0095154 | A1* | 4/2015 | Kannan | G06Q 30/0257 705/14.55 |
| 2016/0232624 | A1* | 8/2016 | Goldberg | G06Q 30/02 |

OTHER PUBLICATIONS

Irena Pletikosa Cvijikj, et al.; "The Effect of Post Type, Category and Posting Day on User Interaction Level on Facebook"; 2011 IEEE International Conference on Privacy, Security, Risk, and Trust, and IEEE International Conference on Social Computing; IEEE Computer Society; pp. 810-813; Copyright 2011 IEEE.

* cited by examiner

EVENT DETERMINATION AND INVITATION GENERATION

FIELD OF THE INVENTION

The present invention relates generally to event determination and invitation generation, and more particularly to determining an event based on a social networking post and generating an invitation to the event in a social network.

BACKGROUND

Online social networks are well known, and examples include LinkedIn, Google+, Facebook, and various additional online social utilities that support social networking. Such social networks can grow as their members discover and connect with like-minded or compatible people who have similar interests or experiences. Without social networks, identifying like-minded people often requires a substantial amount of time and effort, because identifying new people with common interests for friendships is difficult. For example, when two strangers meet, it may take a long conversation to discover their common interests or experiences. Social networks often attempt to streamline or even automate this process.

Social networks track and enable connections between their members (including people, businesses, and other entities). In particular, social networking websites allow their members to efficiently communicate information that is relevant to friends or other connections on social network. Social networks typically incorporate a system for maintaining connections among members in the social network and for maintaining links to content that is likely to be relevant to the members. Social networks also collect and maintain information about their members. This information may be substantially static, such as employer, job type, age, music preferences, interests, and a variety of other attributes, or it may be more dynamic, such as a member's geographic location, or his or her actions within the social network.

A typical modern computer-implemented social networking application allows each member to provide some biographical information, to identify his or her interests, and to make social networking posts about his or her status and daily life. Social networks can also suggest to the member other members with compatible interests. For example, each member can fill out a profile or provide other personal data such as professional interests, career information, and interests in music, books, and movies. Matching algorithms can then use the profile to match members with other members who are deemed compatible by the algorithms, under the assumption, for example, that matching people's interests and values can lead to successful new friendships or relationships within (or outside of) the social network.

Typically, when a member of a social network wishes to share information with other members of the social network, the member uploads or copies and pastes the information to a location on the social network as a social networking post, or sends the information in the form of a private message or email to other members.

SUMMARY

Embodiments of the present invention provide for a program product, system, and method to create an invitation on a social network. To create the invitation, a computer receives, from a social networking program operating on a first computer system by an event program operating on a second computer system, data from a social networking post. The computer identifies, by the event program, information from the data associated with a first member of a social network. The computer determines whether the information includes information about a future event that the first member intends to participate in. The computer generates an invitation to a second member of the social network for the future event based on the information about the future event. The computer transmits the invitation for the social networking post for sending by the social networking program to a user device of the second member of the social network.

DETAILED DESCRIPTION

Figure 1:
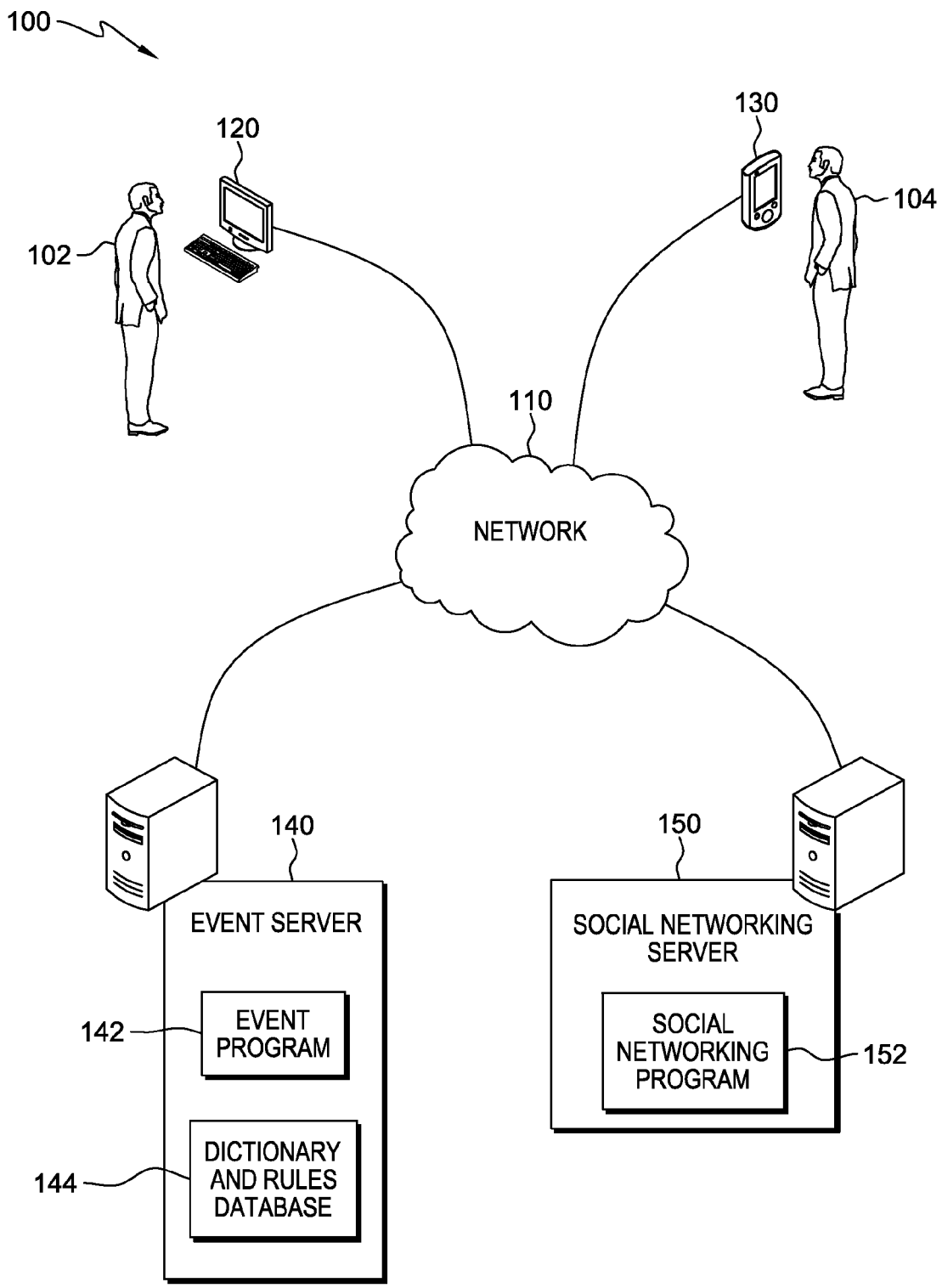
FIG. 1 is a functional block diagram of a social networking environment in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a functional block diagram of social networking environment 100 in accordance with an embodiment of the present invention is shown. Social networking environment 100 includes network 110, user device 120, user device 130, event server 140, and social networking server 150. Network 110 can be, for example, a local area network (LAN), a wide area network (WAN) such as the Internet, or a combination of the two, and can include wired or wireless connections. In general, network 110 can be any combination of connections and protocols that will support communications via various channels between user device 120, user device 130, event server 140, and social networking server 150 in accordance with an embodiment of the invention. Persons 102 and 104 can use social networking system 100 to participate in a social network with one another as discussed below.

In various embodiments, each one of user device 120, user device 130, event server 140, and social networking server 150 can include a laptop, tablet, or netbook personal computer (PC), a desktop computer, a personal digital assistant (PDA), a smart phone, a mainframe computer, or a networked server computer. Further, event server 140 and social networking server 150 can be computing systems utilizing clustered computers and components to act as single pools of seamless resources when accessed through network 110, or can represent one or more cloud computing datacenters. In general, each one of user device 120, user device 130, event server 140, and social networking server 150 can be any programmable electronic device as described in further detail with respect to FIG. 4.

User device 120 and user device 130 each includes a social network client program, which operates as a client of social networking program 152. Each social network client program provides person 102 or person 104 with access to the social network at least partially hosted by social networking server 150. A social network client program can include, for example, a web browser or a stand-alone client program. User device 120 and user device 130 also each includes an event client program, which operates as a client of event program 142. An event client program can include, for example, a web browser or a stand-alone client program. In one embodiment, the event client program is distributed as an add-on to the social network client program, or in combination with the social network client program.

Social networking server 150 includes social networking program 152, which provides social networking services to members of its social network, such as person 102 and person 104, via their user devices, such as user device 120 and user device 130, each having a social network client program. The provision of social networking services includes tracking and enabling connections between members (including people, businesses, and other entities) or subsets of members. The connections and membership may be static or dynamic and the membership can include various subsets within a social network. As such, substantially every member of the social network has multiple "friends" (i.e., has multiple connections to other members) in the social network. Further, substantially every member of the social network also has friends-of-friends (e.g., has an extended network of more-distant connections, who are each "reachable" in the social graph by traversing two or more friend connections). The provision of social networking services also includes enabling members to participate in, comment on, and create content as a means of communicating with their social graph, as well as the public. Social network content includes, among other things, member profile pages, private messages between members, public posts made onto a member's own profile page by the member, public posts made on another member's profile page by a different member, and tags of members in public photographs, for example. Profile pages can include a combination of public and private information about a member that is visible to other members according to the member's privacy settings. Public posts can include member-generated text, as well as hyperlinks, pictures, or other forms of media. The permutations involving membership and content in a social network are many and not intended to be limiting.

As stated herein above, when a member of a social network wishes to share information with other members of the social network, it is known for the member to upload or copy and paste the information to a location on the social network as a social networking post, or sends the information in the form of a private message or email to other members. However, certain forms of information lack adequate context to enable recipients to respond in a useful way. Therefore, using current techniques, the quality and type of shared information in social networks is limited, and members may be less likely to share information with each other as a result.

According to embodiments of the present invention, event server 140 includes event program 142, which provides event determination services and invitation generation services to social networking program 152. Event server 140 can communicate with user device 120 or user device 130 during the provision of these services, via an event client program of each user device. Event server 140 can also refer to dictionary and rules database 144 while providing such services. The provision of event determination services and invitation generation services includes performing text analytics on a member's social networking posts to determine if the member of the social network is posting about an upcoming event. Text analytics can be performed using an Unstructured Information Management Architecture (UIMA) application configured to analyze unstructured information to discover knowledge that is relevant to event program 142, by processing plain text and identifying entities, such as persons, places, organizations; or relations, such as going-to or located-at. Upcoming events can include, for example, location events, travel events, leisure events, business events, or any other event or activity that will take place in whole or in part in the future. If event program 142 determines the member of the social network is posting about an upcoming event, then event program 142 presents to the posting member a command which the member may invoke to generate one or more invitations to the event in association with creating the social networking post, so that the member's friends (and, in various embodiments, the member's extended network) can more readily learn about the posting member's plan to attend the event and can join the member at the event. In various embodiments, the member is provided with an option to select specific friends to invite to the upcoming event. Having coordinated with the member, event program 142 also coordinates with social networking program 152 to have the social networking post displayed in combination with an invitation flag, for example. The operation of event server 140 is discussed in detail below.

Figure 2:
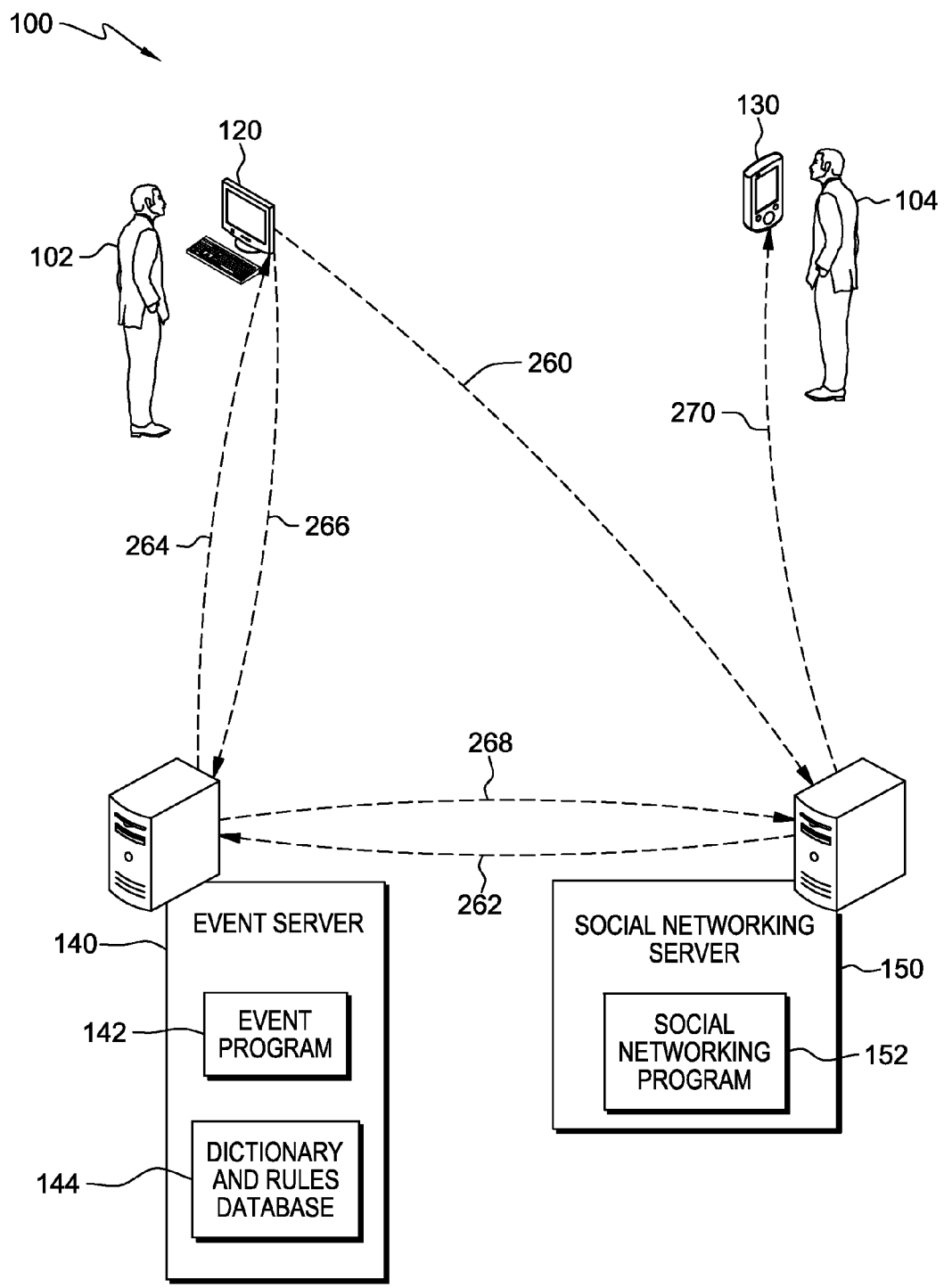
FIG. 2 is a functional block diagram including communications sent during the performance of event determination and invitation generation in accordance with an embodiment of the present invention.

FIG. 2 depicts communications 260 through 270 between user device 120, user device 130, event server 140, and social networking server 150 sent during the performance of event determination and invitation generation in accordance with an illustrative embodiment of the present invention. Each communication depicted in FIG. 2 can be transmitted via network 110 (not shown), for example.

Communication 260, sent from user device 120 to social networking server 150, includes a social networking post prepared by person 102 that will be displayed by social networking program 152 as a public post made on the profile page of person 102. For example, the social networking post can include the text "This Saturday I will be going to the library with my daughter." In one or more embodiments of the invention, social networking server 150 posts the social networking post immediately for viewing by other members of the social network on a profile page of person 102 in parallel with further operations described in detail herein below. The immediately-available social networking posts can be described as a "bare" social networking post. For example, if person 104 were to use user device 130 to access the profile page of person 102 at the presently described stage of operation, then in communication 270 the profile page of person 102 along with the bare social networking post would be transmitted to user device 130. However, as discussed below, after further operations communication 270 will include additional information.

Communication 262 is sent from social networking server 150 to event server 140, and may be responsive to social networking server 150 receiving communication 260. Communication 262 includes the social networking post, an instruction to perform event determination and invitation generation, and additional context information relevant to completing the instructions. Upon receiving communication 262, event program 142 generates a blank event record and performs text analytics on the social networking post's text (e.g., "This Saturday I will be going to the library with my daughter," in the example given above) to determine if person 102 is posting about an upcoming event. During the analytics process, the blank event record is filled in with event information. To perform text analytics, event program 142 can parse the text using a text parser and compare the text against information in dictionary and rules database 144. Dictionary and rules database 144 can include definitions for words, synonyms for words, and rules for sentence construction and interpretation. For example, the text "This Saturday I will be going to the library with my daughter" can be parsed into portions involving actions, times and dates, places, and participants.

In particular, event program 142 can determine an action in the text of the social networking post, based on the text "will be going to" and also based on a rule that identifies the use of the future tense in a social networking post. Typically, use of the future tense is a key indicator that a social networking post might be about a planned event. Further, event program 142 can fill out the blank event record with the time and date of the calendar date of the next Saturday, according to a rule that identifies the phrase "[this] [day of week]" as one which specifies a date in the future as being the next following instance of the stated day of the week. Further, event program 142 can fill out the blank event record with the place of the library closest in proximity to person 102, or closest in proximity to a residence of person 102, based on geographic information about person 102 transmitted from social networking server 150 as additional context information in communication 262. Further, event program 142 can fill out the blank event record with the participants identified in the social networking posts, identifiable by use of the text "I" and "my daughter." The use of the text "I," as an indicator that person 102 himself or herself will be participating in the planned event, is a key indicator that the social networking post is one that an invitation should be generated for (because, generally, individuals are more likely to send out invitations to events that they will also be participating in personally).

Thus, after receiving communication 262, event program 142 has performed text analytics to generate and fill in an event record with details about a possible future event involving person 102 and his or her daughter, on a Saturday following the date the social networking post was made, at a library. Event program 142 can use a quality rule and quality threshold in dictionary and rules database 144 to determine if the event record includes enough information of a sufficient quality to determine that the possible future event is likely. In particular, the quality rule can take into account what percentage of the blanks in the original blank event record have been filled in during the text analytics process. If all of the blanks have been filled in, such that the event record is data rich, then the resulting quality score will be high. Further, the quality rule can also take into account an event history of person 102, transmitted from social networking server 150 in communication 262. For example, if the event history of person 102 shows that person 102 has traveled with his or her daughter to the library on the weekend in the past, then the resulting quality score for the event record will be higher than if no such event is shown in the event history.

If the quality score of the event record satisfies the quality threshold, then event program 142 will treat the event record, generated from the social networking post, as a bona fide future event for which invitation generation will be performed. In one embodiment, prior to generating invitations, event program 142 first confirms the event with and seeks additional details from person 102, by sending the event record in communication 264 to user device 120.

At user device 120, upon receiving communication 264, the event client program prompts person 102 to determine if the details in the event record are correct. If event program 142 made an error during the performance of text analytics, then person 102 has an opportunity to correct them. For example, if the library determined by event program 142 is not the correct library, then person 102 can select a different library. Further, if event program 142 left blanks in the event record during the performance of text analytics, then person 102 has an opportunity to fill the blanks in. For example, because a specific time is not stated in the social networking post, person 102 can fill in this blank in with, for example, the information "10:00 AM."

Event client program also prompts person 102 with the option to select specific members of the social network to invite. For example, person 102 can invite all of his or her friends on the social network, or a portion of his or her friends made by manual selection, or a subset of his or her friends predefined as a group. In particular, in the current example, person 102 might want to invite the group of all of his or her friends who are parents, as well as their children, to the library. The event client program can facilitate the selection process by presenting person 102 with a locally-stored copy of his or her friends, in one embodiment. In another embodiment, the event client program can retrieve the friends of person 102 from social networking server 150. After person 102 has determined that the event record is correct and complete and has selected specific people or categories of people to invite, then user device 120 sends this information to event server 140 in communication 266.

Having determined that the social networking post includes a bona fide event for which invitation generation will be performed, and having sent communication 264 and received communication 266 in response, event server 140 proceeds to generate invitations. Invitations may be generic, or may be tailored for individual recipient members. In one embodiment, event server 140 generates invitations by generating a web page including all relevant information about the future event, and by generating a hyperlink to the web page. In one embodiment, the web page may be hosted on event server 140, while in another embodiment the web page may be hosted on social networking server 150. After generating the invitations, event server 140 transmits the invitations to social networking server 150 in communication 268. In an embodiment in which the invitation web page is hosted on event server 140, the invitation transmitted in communication 268 includes a link to the web page. In an embodiment in which the invitation web page is hosted on social networking server 150, the invitation transmitted in communication 268 is the actual web page to be hosted.

Having received communication 260, sent communication 262, and then received communication 268, social networking program 152 has thus received the social networking post including its text (e.g., "This Saturday I will be going to the library with my daughter"), as well as a group of invitations to the determined future event for the selected members of the social network. Social networking program 152 responsively posts the social networking post for viewing by other members of the social network on the profile page of person 102, along with a link to the invitations. The link to the invitations can be posted in the form of an invitation flag, a hyperlink, or by any other technique suitable for indicating that the displayed post is actionable in a manner to display the invitations.

After social networking program 152 posts the social networking post for viewing, person 104 can access social networking program 152 via user device 130 to view the profile page of person 102 as well as the displayed social networking post, transmitted in communication 270. If person 104 is one of the specific members of the social network selected by person 102 to receive the invitation, then communication 270 will include the link to the invitation in combination with the social networking post, so that both can be displayed on user device 130 and so that person 104 can accept the invitation. Person 104 can accept the invitation by, for example, clicking on the link to the invitation, so that the invitation is transmitted to user device 130 from the location where it is hosted (e.g., at event server 140 or at social networking server 150). However, if person 104 was not selected, then communication 270 will not include the link to the invitation and person 104 will see only the bare social networking post.

Figure 3:
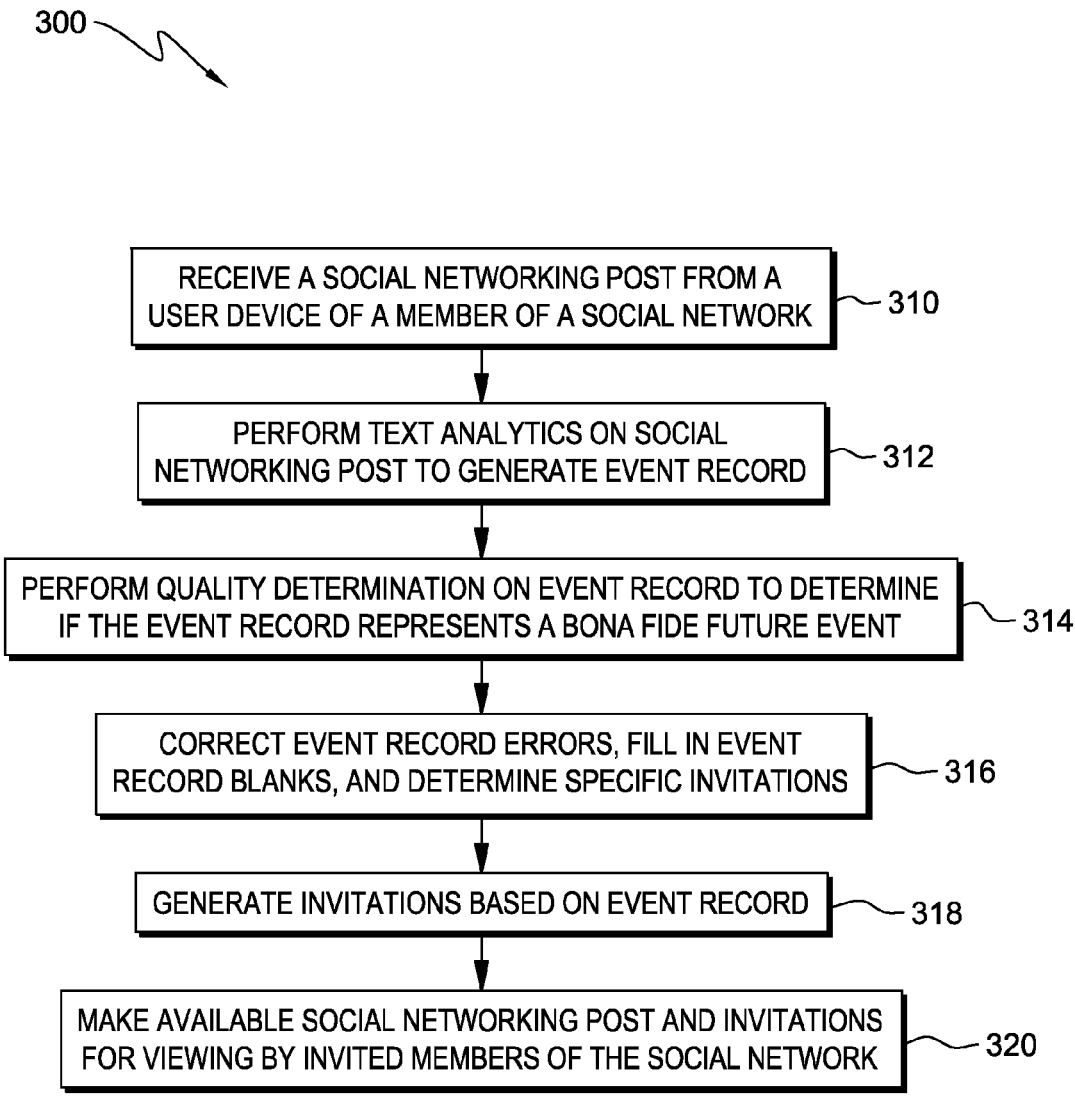
FIG. 3 is a flowchart depicting steps followed by a social networking program and an event program during the performance of event determination and invitation generation in accordance with an embodiment of the present invention.

FIG. 3 depicts flowchart 300 including steps followed by social networking program 152 and event program 142 during the performance of event determination and invitation generation in accordance with an embodiment of the present invention. In step 310, a social networking post is received from a user device of a member of a social network. For example, social networking program 152 can receive a social networking post in communication 260 including the text "This Saturday I will be going to the library with my daughter" from user device 120.

In step 312, text analytics are performed on the social networking post to generate an event record. Text analytics can be performed using an Unstructured Information Management Architecture (UIMA) application configured to analyze unstructured information to discover knowledge that is relevant to event program 142, by processing plain text and identifying entities, such as persons, places, organizations; or relations, such as going-to or located-at. For example, event program 142 can receive the social networking post from social networking program 152 in communication 262 and perform text analytics on the post to generate and fill in an event record. In step 314, a quality determination is performed on the event record to determine if the event record represents a bona fide future event. For example, event program 142 can apply quality rules to the event record to determine if a quality threshold is satisfied. If so, the event record represents a bona fide future event.

In step 316, errors in the event record are corrected, blanks in the event record are filled in, and specific invitations are determined. For example, event program 142 can send communication 264 to user device 120, with which person 102 can correct errors, fill in blanks, and determine specific invitations to other members. Having completed these tasks, user device 120 can send results back to event program 142 via communication 266. In step 318, invitations are generated based on an event record. For example, event program 142 can generate invitations by generating a web page including all relevant information about the future event, and by generating a hyperlink to the web page, which can be hosted on event server 140 or social networking server 150, and can ultimately be displayed on user device 130.

In step 320, the social networking post and invitations are posted for viewing by invited members of the social network. For example, social networking program 152 can receive the invitations in communication 268, and can make the social networking post and the invitations available for viewing by other members of the social network on the profile page of person 102, along with a link to the invitations. The link to the invitations can be posted in the form of an invitation flag, a hyperlink, or by any other technique suitable for indicating that the displayed post is actionable in a manner to display the invitation. If a viewing member utilizing user device 130 is one of the specific members of the social network selected by person 102 to receive the invitation, then he or she will see the link to the invitation in combination with the social networking post. The viewing member may select the link, and responsive to the selection the hosting server (e.g., event server 140 or social networking server 150) may transmit the invitation to user device 130, so that the viewing member may accept the invitation upon viewing it. However, if the viewing member was not selected, then he or she will see only the bare social networking post.

Figure 4:
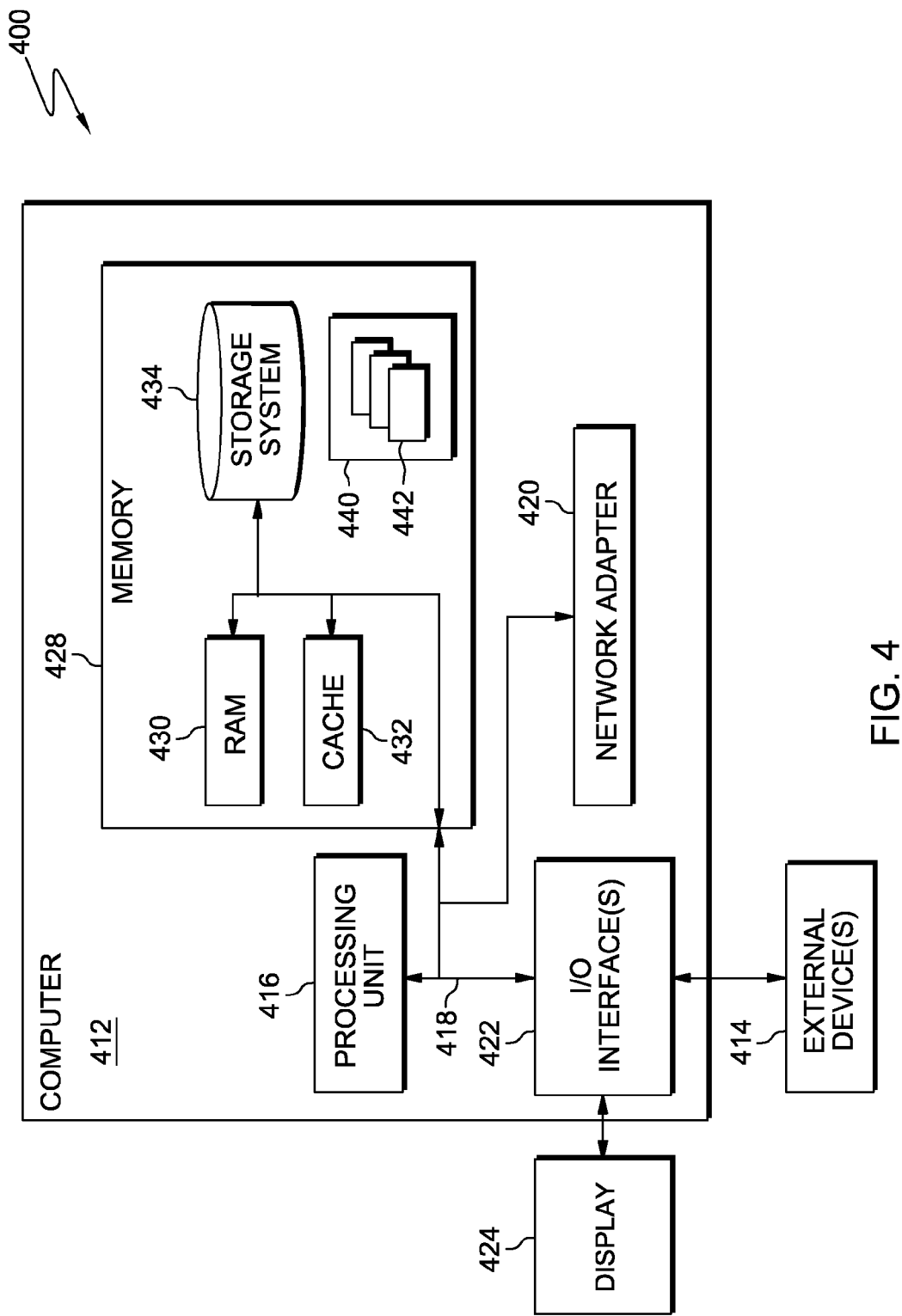
FIG. 4 is a functional block diagram of a computer system in accordance with an embodiment of the present invention.

Referring now to FIG. 4, a functional block diagram of a computer system in accordance with an embodiment of the present invention is shown. Computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove.

In computer system 400 there is computer 412, which is operational with numerous other general purpose or special purpose computing system environments or configurations. Examples of well-known computing systems, environments, and/or configurations that may be suitable for use with computer 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of user device 120, user device 130, event server 140, and social networking server 150 can include or can be implemented as an instance of computer 412.

Computer 412 may be described in the general context of computer system executable instructions, such as program modules, being executed by a computer system. Generally, program modules may include routines, programs, objects, components, logic, data structures, and so on that perform particular tasks or implement particular abstract data types. Computer 412 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 4, computer 412 in computer system 400 is shown in the form of a general-purpose computing device. The components of computer 412 may include, but are not limited to, one or more processors or processing units 416, memory 428, and bus 418 that couples various system components including memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 412 typically includes a variety of computer system readable media. Such media may be any available media that is accessible by computer 412, and includes both volatile and non-volatile media, and removable and non-removable media.

Memory 428 can include computer system readable media in the form of volatile memory, such as random access memory (RAM) 430 and/or cache 432. Computer 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program 440, having one or more program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Each one of event program 142 and social networking program 152 can be implemented as or can be an instance of program 440.

Computer 412 may also communicate with one or more external devices 414 such as a keyboard, a pointing device, etc., as well as display 424; one or more devices that enable a user to interact with computer 412; and/or any devices (e.g., network card, modem, etc.) that enable computer 412 to communicate with one or more other computing devices. Such communication can occur via Input/Output (I/O) interfaces 422. Still yet, computer 412 can communicate with one or more networks such as a local area network (LAN), a general wide area network (WAN), and/or a public network (e.g., the Internet) via network adapter 420. As depicted, network adapter 420 communicates with the other components of computer 412 via bus 418. It should be understood that although not shown, other hardware and/or software components could be used in conjunction with computer 412. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for creating an invitation on a social network, the method comprising the steps of:
   receiving, from a social networking program operating on a first computer system by an event program operating on a second computer system, data from a social networking post;
   identifying, by the event program, information from the data associated with a first member of a social network;
   determining, by the event program, whether the information includes information about a future event that the first member intends to participate in;
   generating, by the event program, an event record based on the information about the future event;
   responsive to generating the event record, determining, by the event program, whether the information about the future event in the event record is above a numeric threshold, wherein the numeric threshold is a percentage of fields in the event record that are filled in with information, wherein the threshold is below one hundred percent and above zero percent;
   responsive to determining that the information about the future event in the event record is above a numeric threshold, transmitting, by the event program, the event record to the first member of the social network;
   receiving, from the first member of the social network by the event program, one or more updates to the event record, wherein the updates include one or more of the following: an update to the event record or adding information to the event record;
   receiving, from the first member of the social network by the event program, one or more members of the social network to transmit an invitation to;
   responsive to receiving one or more updates to the event record, updating, by the event program, the event record with the one or more updates to the event record; and
   generating, by the event program, an invitation to each member of the one or more members of the social network for the future event based on the event record.

2. The method of claim 1, further comprising the step of:
   transmitting, by the event program, the invitation for each member of the one or more members for the social networking post for sending by the social networking program to a user device of each member of the one or more members of the social network.

3. The method of claim 1, further comprising the step of:
   responsive to determining that the information about the future event in the event record is below a numeric threshold, requesting, by the event program, additional information about the event record from the first member of the social network;
   receiving, by the event program, the additional information about the event record from a user device of the first member of the social network; and
   updating, by the event program, the event record using the additional information.

4. The method of claim 1, further comprising the step of:
   receiving, by the event program, an acceptance of the invitation from a user device of a member of the one or more members of the social network.

5. The method of claim 1, wherein the determining whether the information includes information about a future event includes performing text analytics on the information.

6. A computer program product for creating an invitation on a social network, the computer program product comprising:
   one or more computer-readable tangible storage devices and program instructions stored on at least one of the one or more storage devices, the program instructions comprising:
   program instructions to receive, from a social networking program, data from a social networking post;
   program instructions to identify information from the data associated with a first member of a social network;
   program instructions to determine whether the information includes information about a future event that the first member intends to participate in;
   program instructions to generate an event record based on the information about the future event;
   program instructions, responsive to generating the event record, to determine whether the information about the future event in the event record is above a numeric threshold, wherein the numeric threshold is a percentage of fields in the event record that are filled in with information, wherein the threshold is below one hundred percent and above zero percent;
   program instructions, responsive to determining that the information about the future event in the event record is above a numeric threshold, to transmit the event record to the first member of the social network;
   program instructions to receive, from the first member of the social, one or more updates to the event record, wherein the updates include one or more of the following: an update to the event record or adding information to the event record;

program instructions to receive, from the first member of the social network, one or more members of the social network to transmit an invitation to;

program instructions, responsive to receiving one or more updates to the event record, to update, the event record with the one or more updates to the event record; and program instructions to generate an invitation to each member of the one or more members of the social network for the future event based on the event record.

7. The computer program product of claim 6, further comprising:

program instructions to transmit the invitation for each member of the one or more members for the social networking post for sending by the social networking program to a user device of each member of the one or more members of the social network.

8. The computer program product of claim 6, further comprising:

program instructions, responsive to determining that the information about the future event in the event record is below a numeric threshold, to request additional information about the event record from the first member of the social network;

program instructions to receive the additional information about the event record from a user device of the first member of the social network; and program instruction to update the event record using the additional information.

9. The computer program product of claim 6, further comprising:

program instructions to receive an acceptance of the invitation from a user device of a member of the one or more members of the social network.

10. The computer program product of claim 6, wherein determining whether the information includes information about a future event includes performing text analytics on the information.

11. A system for creating an invitation on a social network, the system comprising:

one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to receive, from a social networking program, data from a social networking post;

program instructions to identify information from the data associated with a first member of a social network;

program instructions to determine whether the information includes information about a future event that the first member intends to participate in;

program instructions to generate an event record based on the information about the future event;

program instructions, responsive to generating the event record, to determine whether the information about the future event in the event record is above a numeric threshold, wherein the numeric threshold is a percentage of fields in the event record that are filled in with information, wherein the threshold is below one hundred percent and above zero percent;

program instructions, responsive to determining that the information about the future event in the event record is above a numeric threshold, to transmit the event record to the first member of the social network;

program instructions to receive, from the first member of the social, one or more updates to the event record, wherein the updates include one or more of the following: an update to the event record or adding information to the event record;

program instructions to receive, from the first member of the social network, one or more members of the social network to transmit an invitation to;

program instructions, responsive to receiving one or more updates to the event record, to update, the event record with the one or more updates to the event record; and program instructions to generate an invitation to each member of the one or more members of the social network for the future event based on the event record.

12. The system of claim 11, further comprising:

program instructions to transmit the invitation for each member of the one or more members for the social networking post for sending by the social networking program to a user device of each member of the one or more members of the social network.

13. The system of claim 11, further comprising:

program instructions, responsive to determining that the information about the future event in the event record is below a numeric threshold, to request additional information about the event record from the first member of the social network;

program instructions to receive the additional information about the event record from a user device of the first member of the social network; and program instruction to update the event record using the additional information.

14. The system of claim 11, further comprising:

program instructions to receive an acceptance of the invitation from a user device of a member of the one or more members of the social network.

15. The method of claim 1, wherein each invitation generated for each member of the one or more members is tailored specifically for each member of the one or more members.

16. The method of claim 6, wherein each invitation generated for each member of the one or more members is tailored specifically for each member of the one or more members.

17. The method of claim 11, wherein each invitation generated for each member of the one or more members is tailored specifically for each member of the one or more members.

\* \* \* \* \*